United States Patent
Pan et al.

(10) Patent No.: US 11,287,106 B1
(45) Date of Patent: Mar. 29, 2022

(54) BACKLIGHT MODULE

(71) Applicant: Darwin Precisions Corporation, Hsinchu County (TW)

(72) Inventors: Yi-Kuei Pan, Hsinchu County (TW); Yu-Ming Huang, Hsinchu County (TW); Yu-Shan Shen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/199,483

(22) Filed: Mar. 12, 2021

(30) Foreign Application Priority Data

Oct. 30, 2020 (TW) .................................. 109137976

(51) Int. Cl.
*F21V 5/04* (2006.01)
*F21V 5/00* (2018.01)

(52) U.S. Cl.
CPC .............. *F21V 5/046* (2013.01); *F21V 5/007* (2013.01); *F21V 5/043* (2013.01)

(58) Field of Classification Search
CPC .......... F21V 5/007; F21V 5/043; F21V 5/046; G02F 1/133602
See application file for complete search history.

(56) References Cited

U.S. PATENT DOCUMENTS

| 6,598,998 | B2 | 7/2003 | West et al. |
| 8,633,641 | B2* | 1/2014 | Lin ........................... F21V 5/04 |
| | | | 313/327 |
| 9,328,879 | B2* | 5/2016 | Wang ........................ F21V 7/00 |
| 2006/0002151 | A1* | 1/2006 | Park .................. G02F 1/133603 |
| | | | 362/631 |
| 2006/0208269 | A1* | 9/2006 | Kim ........................ H01L 33/54 |
| | | | 257/98 |
| 2017/0059122 | A1* | 3/2017 | Chiu ..................... F21V 7/0091 |
| 2017/0234507 | A1 | 8/2017 | Kang |
| 2018/0052259 | A1* | 2/2018 | Chang ................ G02B 19/0061 |
| 2018/0102459 | A1 | 4/2018 | Huang et al. |
| 2018/0306406 | A1 | 10/2018 | Kang et al. |

FOREIGN PATENT DOCUMENTS

| JP | 2010-251053 A | 11/2010 |
| JP | 2017-147227 A | 8/2017 |
| JP | 2018-515898 A | 6/2018 |
| TW | I608636 B | 12/2017 |
| TW | 201814924 A | 4/2018 |

* cited by examiner

*Primary Examiner* — Julie A Bannan
(74) *Attorney, Agent, or Firm* — WPAT, PC

(57) ABSTRACT

A backlight module includes a base plate, a plurality of light-emitting elements and a plurality of lenses. The light-emitting elements are disposed on the base plate. The lenses are disposed on the base plate and respectively correspond to the light-emitting elements. Each of the lenses has a side surface and a plurality of diffusing portions. The diffusing portions are located on the side surface. At least one of the diffusing portions of each of the lenses is located between adjacent two of the corresponding lenses.

9 Claims, 11 Drawing Sheets

BACKLIGHT MODULE

RELATED APPLICATIONS

This application claims priority to Taiwanese Application Serial Number 109137976 filed Oct. 30, 2020, which is herein incorporated by reference.

BACKGROUND

Technical Field

The present disclosure relates to backlight modules.

Description of Related Art

With regard to the continuous increase of the living quality of people, the application of electronic products has become an indispensable part of life. Among a wide variety of electronic products, electronic products with function of display have become more and more popular. On the contrary, relative to the rapid development of technology, the demand and expectation of people for electronic products have also been increasing.

As a result, apart from working hard by the manufacturers to decrease the cost of production of electronic products, the way to improve the quality of electronic products is undoubtedly an important direction of development of the industry.

SUMMARY

A technical aspect of the present disclosure is to provide a backlight module of a more uniform brightness, which can facilitate the improvement of the taste of brightness of the display device.

According to an embodiment of the present disclosure, a backlight module includes a base plate, a plurality of light-emitting elements and a plurality of lenses. The light-emitting elements are disposed on the base plate. The lenses are disposed on the base plate and respectively correspond to the light-emitting elements. Each of the lenses has a side surface and a plurality of diffusing portions. The diffusing portions are located on the side surface. At least one of the diffusing portions of each of the lenses is located between adjacent two of the corresponding lenses.

In one or more embodiments of the present disclosure, each of the lenses has a center. One of the diffusing portions of each of the lenses is located on a line connecting between the centers of adjacent two of the corresponding lenses.

In one or more embodiments of the present disclosure, each of the diffusing portions includes at least one protruding structure.

In one or more embodiments of the present disclosure, each of the diffusing portions includes at least one adhesive layer. An optical penetration rate of the adhesive layer is less than 80%.

In one or more embodiments of the present disclosure, each of the diffusing portions includes a plurality of scattering particles.

In one or more embodiments of the present disclosure, each of the lenses has a recessive portion. The corresponding one of the light-emitting elements is at least partially located in the recessive portion.

In one or more embodiments of the present disclosure, the side surface of each of the lenses has a perimeter. Each of the diffusing portions of each of the lenses has a width. A sum of the widths of the diffusing portions of each of the lenses is less than the perimeter.

In one or more embodiments of the present disclosure, a ratio of the sum of the widths of the diffusing portions of each of the lenses to the corresponding perimeter is between 1% and 67%.

In one or more embodiments of the present disclosure, the side surface of each of the lenses has a first area. Each of the diffusing portions of each of the lenses has a second area. A sum of the second areas of the diffusing portions of each of the lenses is less than the first area.

In one or more embodiments of the present disclosure, a ratio of the sum of the second areas of the diffusing portions of each of the lenses to the corresponding first area is between 0.5% and 67%.

When compared with the prior art, the above-mentioned embodiments of the present disclosure have at least the following advantages: the light rays emitted towards each other from adjacent two of the light-emitting elements through the lenses are first diffused by the diffusing portions, such that the brightness of the light rays along the direction of the line connecting between the centers of adjacent two of the corresponding lenses are effectively reduced. Therefore, the zone between adjacent two of the lenses will not be brighter than the surrounding zones due to the irradiation by adjacent two of the light-emitting elements at the same time. Hence, the brightness that the backlight module provides to the display panel can be more uniform, which facilitates the improvement of the taste of brightness of the display device.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
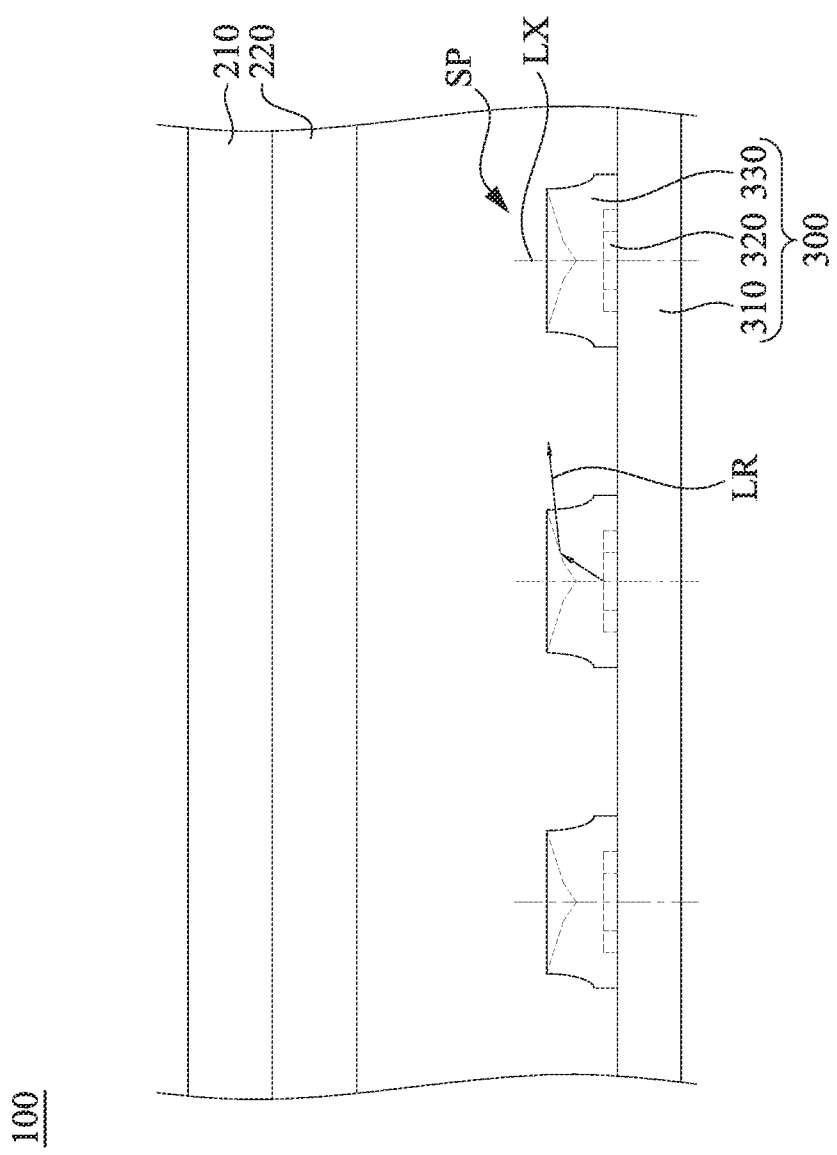
FIG. 1 is a sectional view of a display device according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a sectional view of a display device 100 according to an embodiment of the present disclosure. In this embodiment, as shown in FIG. 1, a display device 100 includes a display panel 210, an optical diffusing plate 220 and a backlight module 300, in which the optical diffusing plate 220 is located between the display panel 210 and the backlight module 300. Moreover, the backlight module 300 includes a base plate 310, a plurality of light-emitting elements 320 and a plurality of lenses 330. The base plate 310 and the optical diffusing plate 220 define a space SP therebetween. The light-emitting elements 320 are located in the space SP and disposed on the base plate 310. The lenses 330 are also located in the space SP. The lenses 330 are disposed on the base plate 310 and respectively correspond to the light-emitting elements 320. Each of the lenses 330 is at least partially located on the corresponding light-emitting element 320. In practical applications, each of the light-emitting elements 320 emits a light ray LR at least partially towards the display panel 210. The light rays LR are at least partially diffused in the space SP through the corresponding lenses 330.

Figure 2:
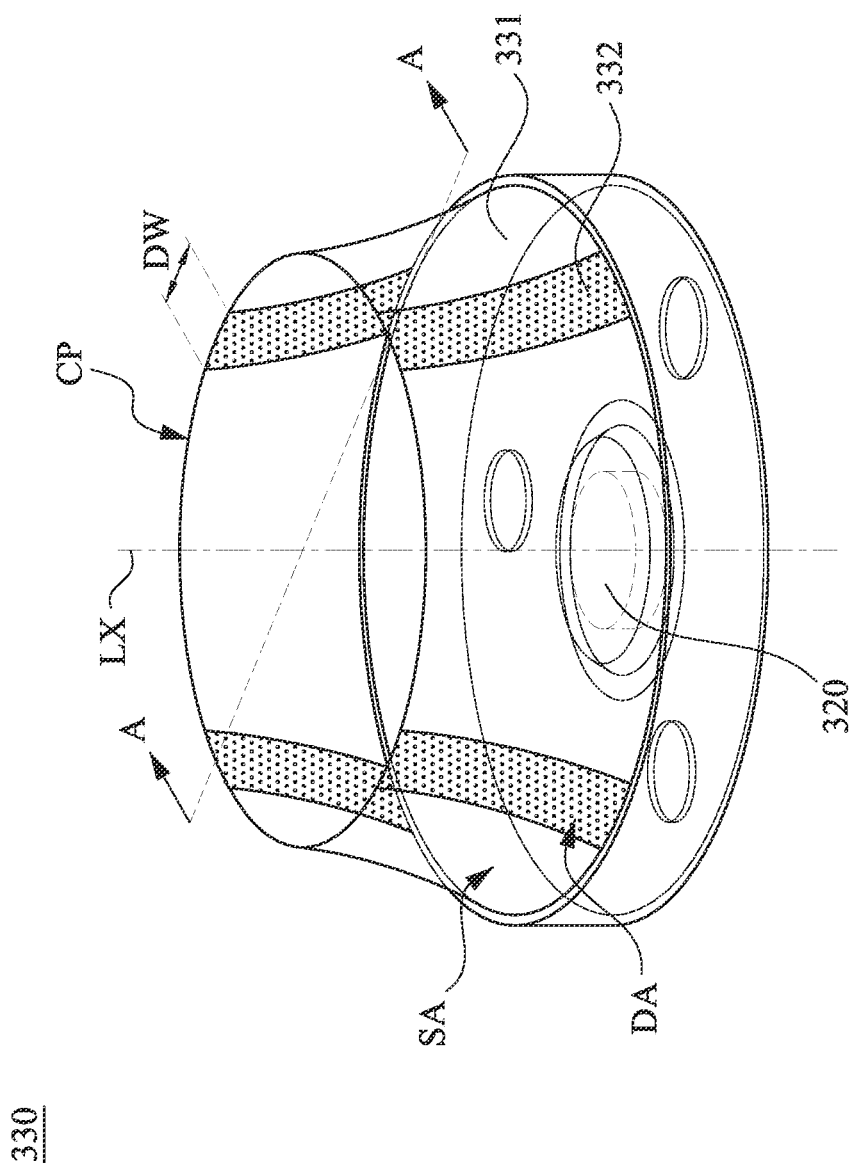
FIG. 2 is an enlarged schematic view of the lens of FIG. 1.

Reference is made to FIG. 2. FIG. 2 is an enlarged schematic view of the lens 330 of FIG. 1. In this embodiment, as shown in FIG. 2, each of the lenses 330 has a side surface 331 and a plurality of diffusing portions 332. The side surface 331 surrounds about an optical axis LX. The optical axis LX passes through the corresponding light-emitting element 320. The diffusing portions 332 are located on the side surface 331.

Moreover, as shown in FIG. 2, the side surface 331 of the lens 330 has a perimeter CP. Each of the diffusing portions 332 of the lens 330 has a width DW. A sum of the widths DW of the diffusing portions 332 of the lens 330 is less than the perimeter CP. This means the diffusing portions 332 do not entirely cover the side surface 331, and the diffusing portions 332 are separated from each other. In this embodiment, the perimeter CP is particularly a perimeter formed by the upper part of the side surface 331. However, this does not intend to limit the present disclosure. In other embodiments, the perimeter CP can be a perimeter formed by a sectional area of the lens 330 cutting through the side surface 331, and the width DW of the diffusing portion 332 is a width on the edge of the sectional area of the lens 330. In one embodiment, a ratio of the sum of the widths DW of the diffusing portions 332 of the lenses 330 to the corresponding perimeter CP is between 1% and 67%.

As shown in FIG. 2, the side surface 331 of the lens 330 has a first area SA. Each of the diffusing portions 332 of the lens 330 has a second area DA. A sum of the second areas DA of the diffusing portions 332 of the lens 330 is less than the first area SA. This means the diffusing portions 332 do not entirely cover the side surface 331, and the diffusing portions 332 are separated from each other. In one embodiment, a ratio of the sum of the second areas DA of the diffusing portions 332 of the lens 330 to the corresponding first area SA is between 0.5% and 67%.

Figure 3:
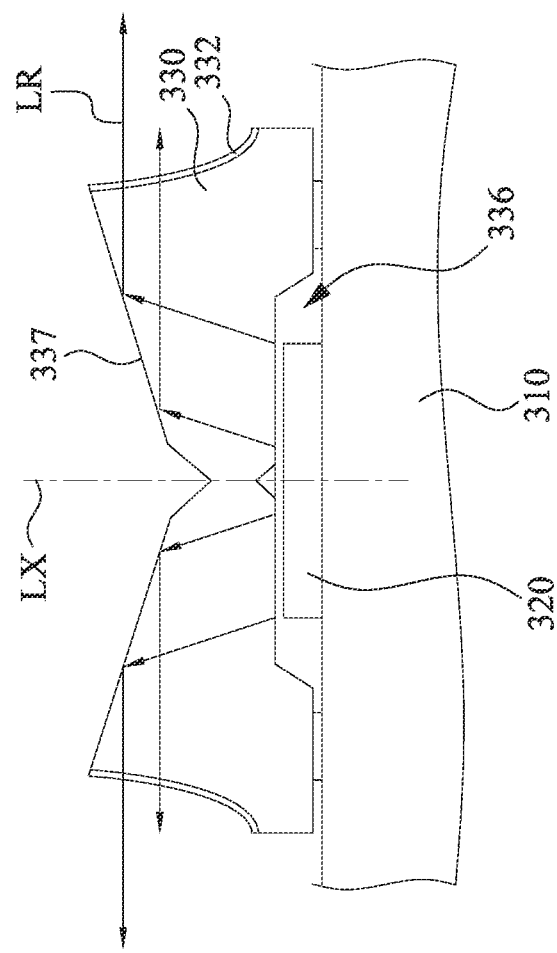
FIG. 3 is a sectional view along the section line A-A of FIG. 2.

Reference is made to FIG. 3. FIG. 3 is a sectional view along the section line A-A of FIG. 2. For the sake of easy understanding, one of the light-emitting elements 320 and the base plate 310 are shown in FIG. 3. In this embodiment, as shown in FIG. 3, the lens 330 has a recessive portion 336 and a reflective surface 337 opposite to each other. The recessive portion 336 is located on a side of the lens 330 facing to the base plate 310. The corresponding one of the light-emitting elements 320 is at least partially located in the recessive portion 336. The reflective surface 337 is located on a side of the lens 330 away from the base plate 310. The optical axis LX passes through the light-emitting element 320, the recessive portion 336 and the reflective surface 337. When the backlight module 300 operates, each of the light-emitting elements 320 emits the light ray LR at least partially along the corresponding optical axis LX. Each of the light rays LR is at least partially reflected by the reflective surface 337 after entering into the corresponding lens 330. A portion of each of the light rays LR as reflected by the corresponding reflective surface 337 is at least partially diffused in the space SP through the corresponding diffusing portions 332.

Figure 4:
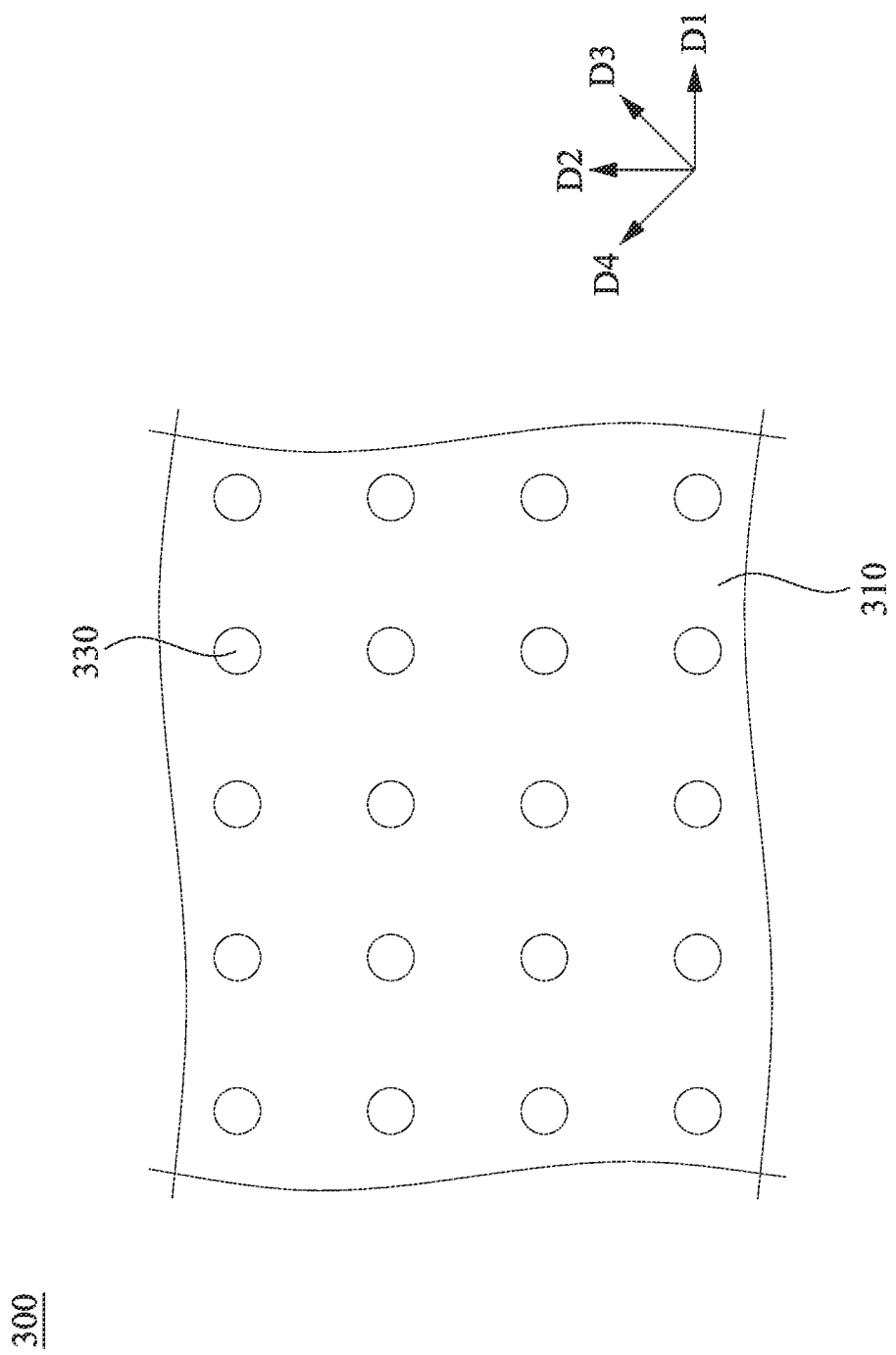
FIG. 4 is a top view of the backlight module of FIG. 1.

Reference is made to FIG. 4. FIG. 4 is a top view of the backlight module 300 of FIG. 1. In this embodiment, as shown in FIG. 4, the lenses 330 and the light-emitting elements 320 (please refer to FIGS. 1-3) are arranged as a matrix. This means the lenses 330 are arranged along a first direction D1 and a second direction D2 on the base plate 310. The first direction D1 and the second direction D2 are perpendicular to each other.

Figure 5:
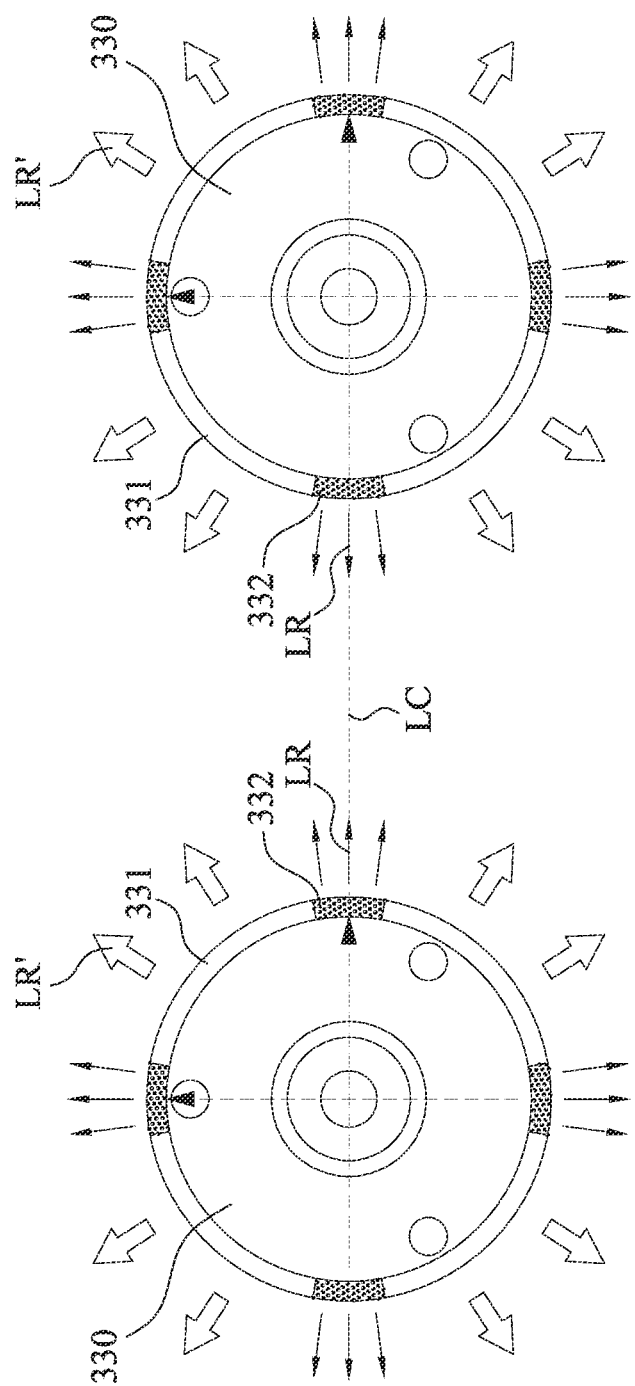
FIG. 5 is a regionally enlarged view of the lenses of FIG. 4.

Reference is made to FIG. 5. FIG. 5 is a regionally enlarged view of the lenses 330 of FIG. 4. In this embodiment, as shown in FIG. 5, each of the lenses 330 has a center. One of the diffusing portions 332 of each of the lenses 330 is located on a line LC connecting between the centers of adjacent two of the corresponding lenses 330. In other words, at least one of the diffusing portions 332 of each of the lenses 330 is located between adjacent two of the corresponding lenses 330. In this way, the light rays LR emitted towards each other from adjacent two of the light-emitting elements 320 (please refer to FIGS. 1-3) through the lenses 330 are first diffused by the diffusing portions 332, such that the brightness of the light rays LR along the direction of the line LC are effectively reduced. Therefore, the zone between adjacent two of the lenses 330 will not be brighter than the surrounding zones due to the irradiation by adjacent two of the light-emitting elements 320 at the same time. Through the configuration of the diffusing portions 332, the brightness between adjacent two of the lenses 330 is substantially the same as the brightness in the direction along which the light ray LR' is emitted from the side surface 331 without a diffusing portion 332. Hence, the brightness that the backlight module 300 provides to the display panel 210 can be more uniform, which facilitates the improvement of the taste of brightness of the display device 100.

In this embodiment, since the lenses 330 (also the light-emitting elements 320) are arranged as a matrix, as shown in FIGS. 2 & 5, each of the lenses 330 has four diffusing portions 332 evenly distributed at the four sides of the lens 330, such that at least one of the diffusing portions 332 of each of the lenses 330 is located between adjacent two of the lenses 330.

Figure 6:
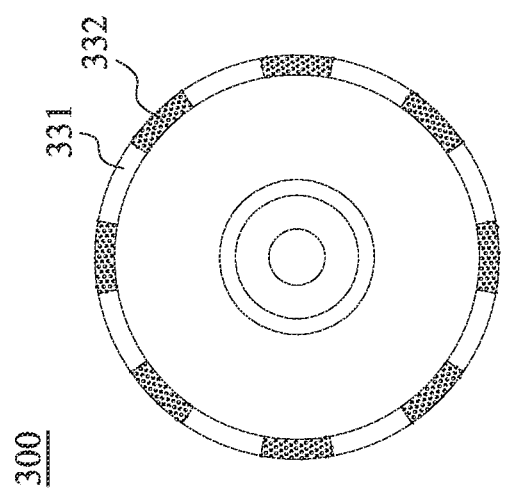
FIG. 6 is a top view of a lens according to another embodiment of the present disclosure.

Reference is made to FIG. 6. FIG. 6 is a top view of a lens 330 according to another embodiment of the present disclosure. Corresponding to the way of arrangement of the lenses 330 in FIG. 4, in this embodiment, as shown in FIG. 6, the lens 330 has eight diffusing portions 332 evenly distributed at eight directions of the lens 330. In this way, at least one of the diffusing portions 332 of each of the lenses 330 can be located between adjacent two of the lenses 330 along the along a third direction D3 and a fourth direction D4 (please refer to FIG. 4 for the third direction D3 and the fourth direction D4). The third direction D3 and the fourth direction D4 are perpendicular to each other, and are respectively inclined by 45 degrees relative to the first direction D1 and the second direction D2.

Figure 7:
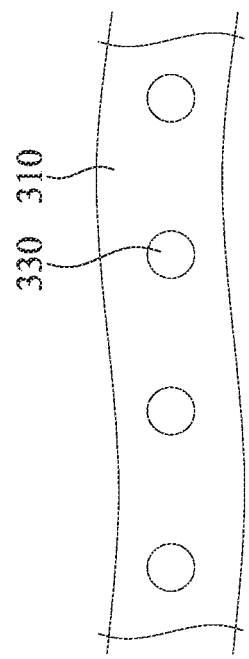
FIG. 7 is a top view of an arrangement of a plurality of lenses according to a further embodiment of the present disclosure.
Figure 8:
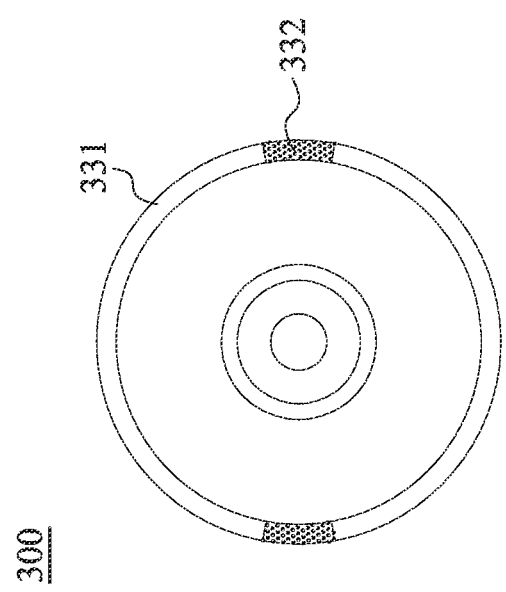
FIG. 8 is a top view of the lens of FIG. 7.

Reference is made to FIGS. 7-8. FIG. 7 is a top view of an arrangement of a plurality of lenses 330 according to a further embodiment of the present disclosure. FIG. 8 is a top view of the lens 330 of FIG. 7. In this embodiment, as shown in FIG. 7, the lenses 300 and the light-emitting elements 320 (please refer to FIGS. 1-3) are arranged along straight lines on the base plate 310. As shown in FIG. 8, correspondingly, each of the lenses 330 has two diffusing portions 332 distributed on two opposite sides of the lens 330, such that at least one diffusing portion 332 of the each of the lenses 330 is located between adjacent two of the lenses 330.

Figure 9:
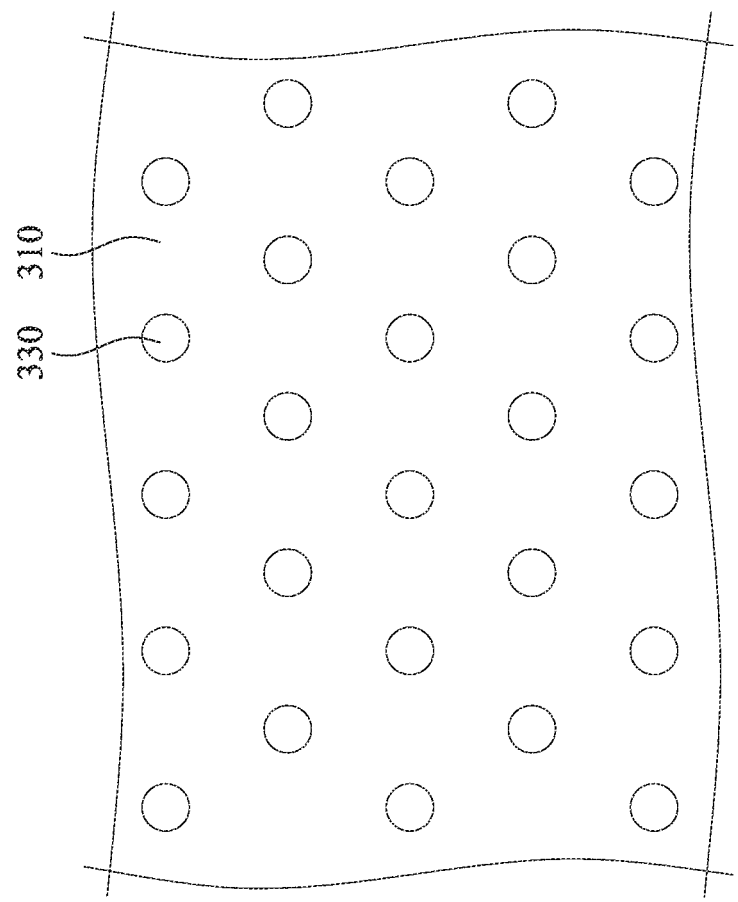
FIG. 9 is a top view of an arrangement of a plurality of lenses according to another embodiment of the present disclosure.
Figure 10:
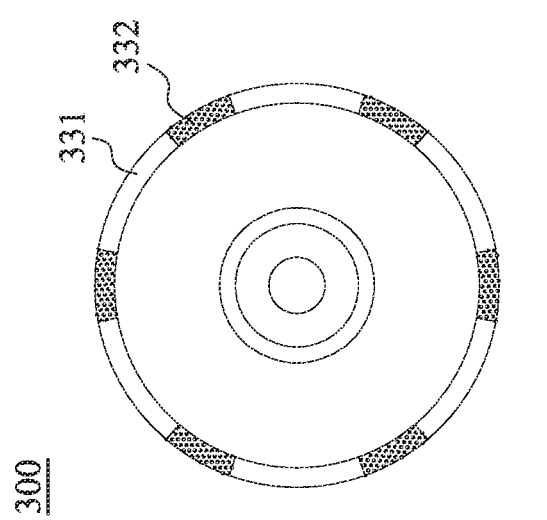
FIG. 10 is a top view of the lens of FIG. 9.

Reference is made to FIGS. 9-10. FIG. 9 is a top view of an arrangement of a plurality of lenses 330 according to another embodiment of the present disclosure. FIG. 10 is a top view of the lens 330 of FIG. 9. In this embodiment, as shown in FIG. 9, the lenses 300 and the light-emitting elements 320 (please refer to FIGS. 1-3) are arranged regularly in a staggered manner on the base plate 310, such that each of the lenses 330 is separated from adjacent six of the lenses 330 by the same distance. As shown in FIG. 10, correspondingly, each of the lenses 330 has six diffusing portions 332 distributed on six directions of the lens 330, such that at least one diffusing portion 332 of the each of the lenses 330 is located between adjacent two of the lenses 330.

Figure 11:
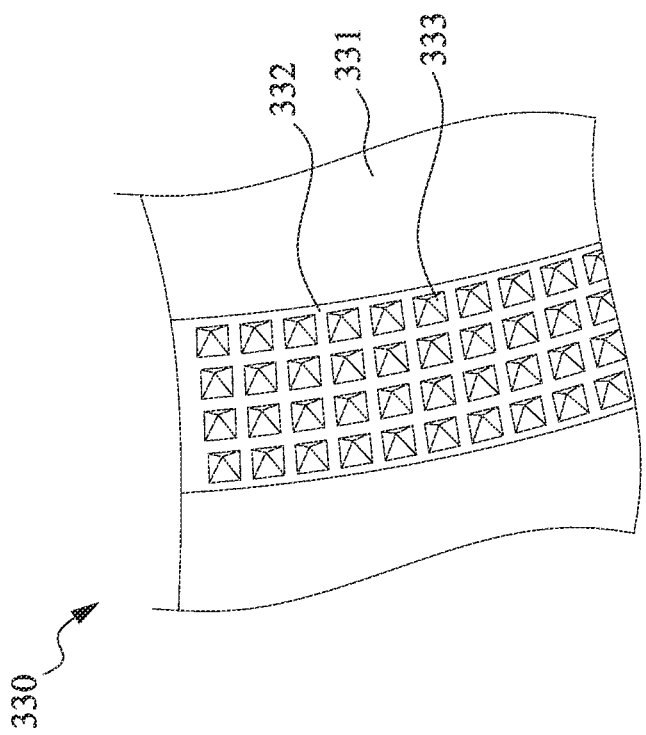
FIG. 11 is a regionally enlarged view of the diffusing portion of FIG. 2.

Reference is made to FIG. 11. FIG. 11 is a regionally enlarged view of the diffusing portion 332 of FIG. 2. In this embodiment, as shown in FIG. 11, each of the diffusing portions 332 of each of the lenses 330 includes a plurality of protruding structures 333. To be specific, each of the protruding structures 333 is of a conical shape. However, this does not intend to limit the present disclosure.

Figure 12:
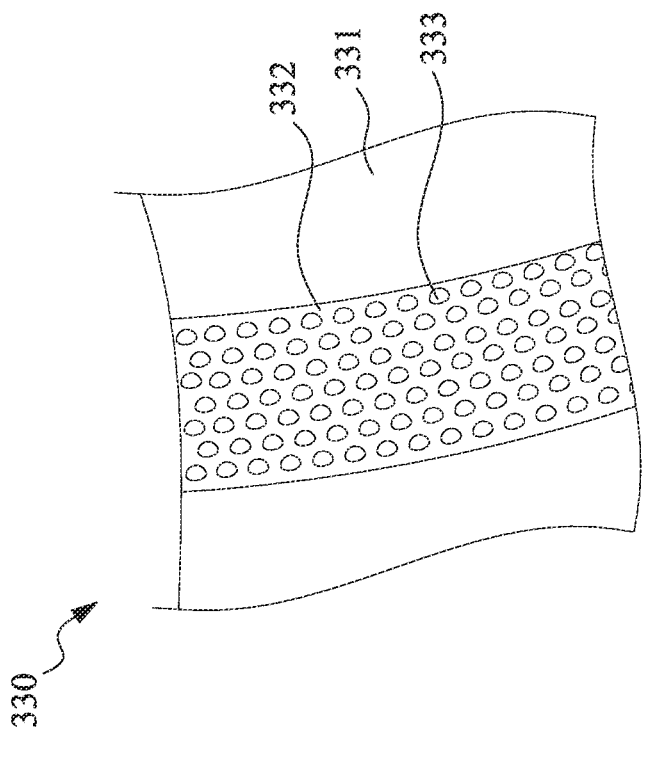
FIG. 12 is a regionally enlarged view of a diffusing portion of a lens according to a further embodiment of the present disclosure.

Reference is made to FIG. 12. FIG. 12 is a regionally enlarged view of a diffusing portion 332 of a lens 330 according to a further embodiment of the present disclosure. In this embodiment, as shown in FIG. 12, each of the diffusing portions 332 of each of the lenses 330 includes a plurality of protruding structures 333. To be specific, each of the protruding structures 333 has a spherical surface. However, this does not intend to limit the present disclosure.

Figure 13:
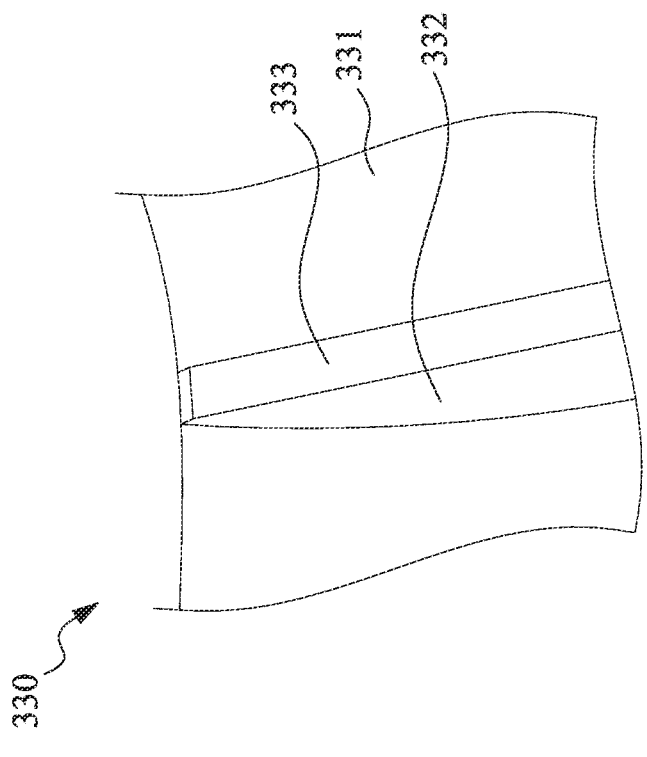
FIG. 13 is a regionally enlarged view of a diffusing portion of a lens according to another embodiment of the present disclosure.

Reference is made to FIG. 13. FIG. 13 is a regionally enlarged view of a diffusing portion 332 of a lens 330 according to another embodiment of the present disclosure. In this embodiment, as shown in FIG. 13, each of the diffusing portions 332 of each of the lenses 330 includes a plurality of protruding structures 333. To be specific, each of the protruding structures 333 is of a striped shape. However, this does not intend to limit the present disclosure.

Figure 14:
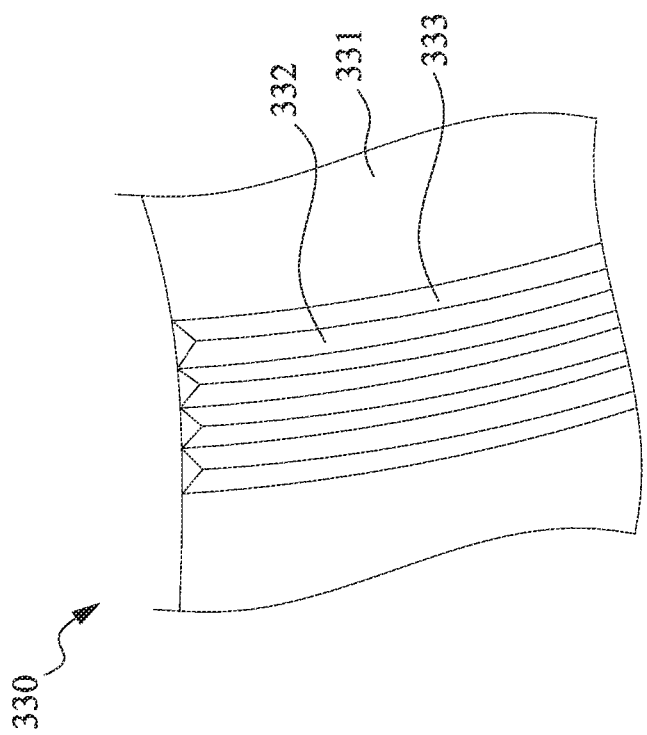
FIG. 14 is a regionally enlarged view of a diffusing portion of a lens according to a further embodiment of the present disclosure.

Reference is made to FIG. 14. FIG. 14 is a regionally enlarged view of a diffusing portion 332 of a lens 330 according to a further embodiment of the present disclosure. In this embodiment, as shown in FIG. 14, each of the diffusing portions 332 of each of the lenses 330 includes at least one protruding structure 333. To be specific, the protruding structure 333 is a prismatic structure. However, this does not intend to limit the present disclosure.

Figure 15:
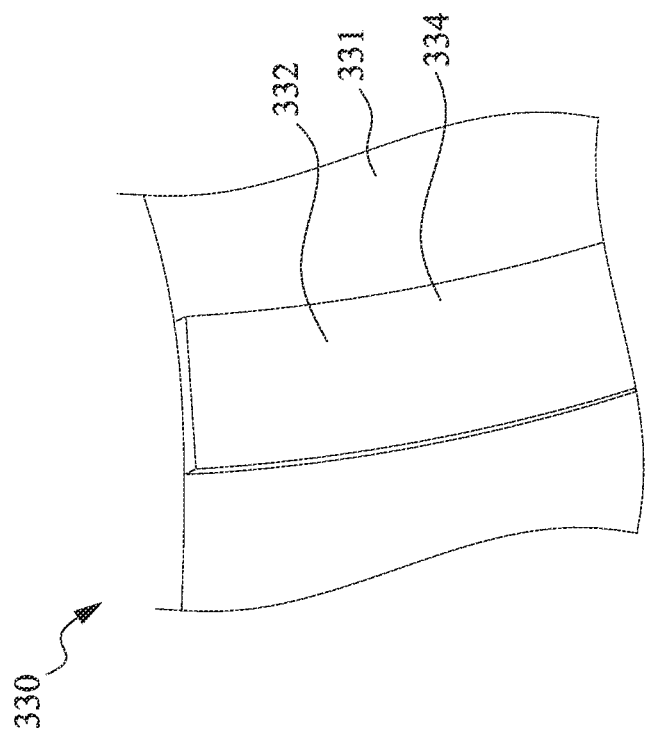
FIG. 15 is a regionally enlarged view of a diffusing portion of a lens according to another embodiment of the present disclosure.

Reference is made to FIG. 15. FIG. 15 is a regionally enlarged view of a diffusing portion 332 of a lens 330 according to another embodiment of the present disclosure. In this embodiment, as shown in FIG. 15, each of the diffusing portions 332 of each of the lenses 330 includes at least one adhesive layer 334. An optical penetration rate of the adhesive layer 334 is less than 80%. In practical applications, the adhesive layer 334 can include a material of resin film or plastic film. However, this does not intend to limit the present disclosure.

Figure 16:
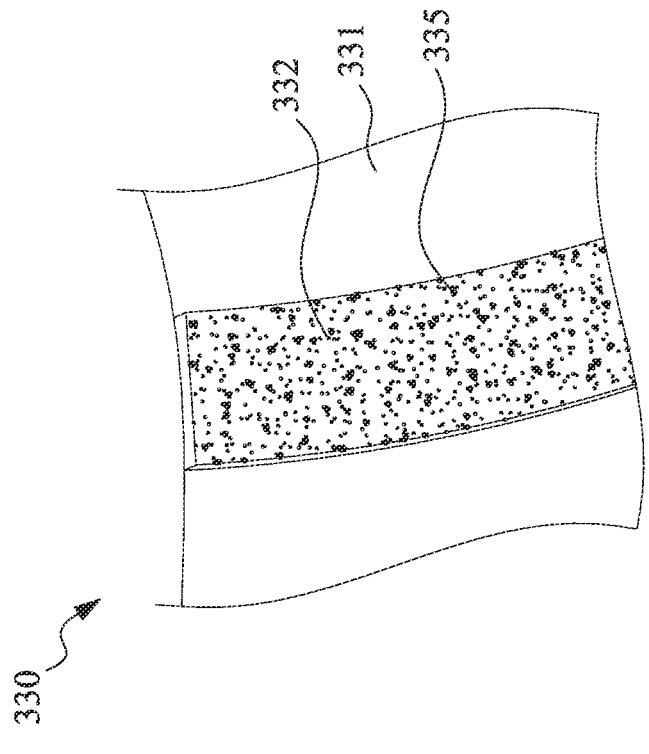
FIG. 16 is a regionally enlarged view of a diffusing portion of a lens according to a further embodiment of the present disclosure.

Reference is made to FIG. 16. FIG. 16 is a regionally enlarged view of a diffusing portion 332 of a lens 330 according to a further embodiment of the present disclosure. In this embodiment, as shown in FIG. 16, each of the diffusing portions 332 of each of the lenses 330 includes a plurality of scattering particles 335. The scattering particles 335 are capable of scattering the light rays LR (please refer to FIGS. 1 & 3 for the light rays LR) in order to achieve the effect of diffusion to the light rays LR.

In conclusion, when compared with the prior art, the aforementioned embodiments of the present disclosure have at least the following advantages: the light rays emitted towards each other from adjacent two of the light-emitting elements through the lenses are first diffused by the diffusing portions, such that the brightness of the light rays along the direction of the line connecting between the centers of adjacent two of the corresponding lenses are effectively reduced. Therefore, the zone between adjacent two of the lenses will not be brighter than the surrounding zones due to the irradiation by adjacent two of the light-emitting elements at the same time. Hence, the brightness that the backlight module provides to the display panel can be more uniform, which facilitates the improvement of the taste of brightness of the display device.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:
1. A backlight module, comprising:
   a base plate;

a plurality of light-emitting elements disposed on the base plate; and a plurality of lenses disposed on the base plate and respectively corresponding to the light-emitting elements, each of the lenses having a side surface and a plurality of diffusing portions located on the side surface, the side surface of each of the lenses having a first area, each of the diffusing portions of each of the lenses having a second area, a sum of the second areas of the diffusing portions of each of the lenses being less than the first area, wherein at least one of the diffusing portions of each of the lenses is located between adjacent two of the corresponding lenses.

2. The backlight module of claim 1, wherein each of the lenses has a center, one of the diffusing portions of each of the lenses is located on a line connecting between the centers of adjacent two of the corresponding lenses.

3. The backlight module of claim 1, wherein each of the diffusing portions comprises at least one protruding structure.

4. The backlight module of claim 1, wherein each of the diffusing portions comprises at least one adhesive layer, an optical penetration rate of the adhesive layer is less than 80%.

5. The backlight module of claim 1, wherein each of the diffusing portions comprises a plurality of scattering particles.

6. The backlight module of claim 1, wherein each of the lenses has a recessive portion, the corresponding one of the light-emitting elements is at least partially located in the recessive portion.

7. The backlight module of claim 1, wherein the side surface of each of the lenses has a perimeter, each of the diffusing portions of each of the lenses has a width, a sum of the widths of the diffusing portions of each of the lenses is less than the perimeter.

8. The backlight module of claim 1, wherein a ratio of the sum of the second areas of the diffusing portions of each of the lenses to the corresponding first area is between 0.5% and 67%.

9. A backlight module, comprising:

a base plate;

a plurality of light-emitting elements disposed on the base plate; and a plurality of lenses disposed on the base plate and respectively corresponding to the light-emitting elements, each of the lenses having a side surface and a plurality of diffusing portions located on the side surface, the side surface of each of the lenses having a perimeter, each of the diffusing portions of each of the lenses having a width, a ratio of a sum of the widths of the diffusing portions of each of the lenses to the corresponding perimeter being between 1% and 67%, wherein at least one of the diffusing portions of each of the lenses is located between adjacent two of the corresponding lenses.

\* \* \* \* \*